(12) United States Patent
Bakshi et al.

(10) Patent No.: US 9,736,503 B1
(45) Date of Patent: Aug. 15, 2017

(54) OPTIMIZING TIMING OF DISPLAY OF A MID-ROLL VIDEO ADVERTISEMENT BASED ON VIEWER RETENTION DATA

(71) Applicant: Google Inc., Mountain View, CA (US)

(72) Inventors: Dhruv Bakshi, Zürich (CH); Jakob Nicolaus Foerster, Zürich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/853,615

(22) Filed: Sep. 14, 2015

Related U.S. Application Data

(60) Provisional application No. 62/049,818, filed on Sep. 12, 2014.

(51) Int. Cl.

| | | |
|---|---|---|
| *H04H 60/32* | (2008.01) | |
| *H04N 21/234* | (2011.01) | |
| *H04N 21/262* | (2011.01) | |
| *H04N 21/2668* | (2011.01) | |
| *H04N 21/442* | (2011.01) | |
| *H04N 21/81* | (2011.01) | |

(52) U.S. Cl.
CPC ..... *H04N 21/23424* (2013.01); *H04N 21/262* (2013.01); *H04N 21/2668* (2013.01); *H04N 21/44222* (2013.01); *H04N 21/812* (2013.01)

(58) Field of Classification Search
CPC ........... H04N 21/23424; H04N 21/262; H04N 21/2668; H04N 21/44222; H04N 21/812
See application file for complete search history.

(56) References Cited

U.S. PATENT DOCUMENTS

| | | | | |
|---|---|---|---|---|
| 6,088,722 A | * | 7/2000 | Herz | G06Q 30/02 348/E7.056 |
| 6,712,468 B1 | * | 3/2004 | Edwards | G06F 3/013 351/209 |
| 8,079,054 B1 | * | 12/2011 | Dhawan | G06Q 30/00 705/14.4 |
| 8,327,395 B2 | * | 12/2012 | Lee | G06Q 30/02 725/10 |
| 8,543,454 B2 | * | 9/2013 | Fleischman | G06Q 30/0201 705/14.44 |
| 8,745,647 B1 | * | 6/2014 | Shin | H04N 21/442 725/10 |
| 2002/0056087 A1 | * | 5/2002 | Berezowski | G06Q 30/02 725/9 |

(Continued)

*Primary Examiner* — An Son P Huynh
(74) *Attorney, Agent, or Firm* — Foley & Lardner LLP; John D. Lanza

(57) ABSTRACT

The timing for displaying a mid-roll advertisement during a video is determined based on analysis of viewer retention data for the video. In an aspect, a system is provided that includes a reception component configured to receive viewer retention information for a video, the viewer retention information identifying amounts of viewers that have watched respective frames of the video, an identification component configured to identify high interest segments of the video based on analysis of the viewer retention information, wherein the high interest segments are associated with relatively higher viewer interest over other segments of the video. The system further includes an advertisement component configured to select a point to insert a mid-roll advertisement during playback of the video at or near at least one of the high interest segments.

20 Claims, 11 Drawing Sheets

(56) References Cited

U.S. PATENT DOCUMENTS

| | | | |
|---|---|---|---|
| 2002/0129368 A1* | 9/2002 | Schlack | G06Q 30/02 725/46 |
| 2003/0093792 A1* | 5/2003 | Labeeb | H04N 7/163 725/46 |
| 2003/0115585 A1* | 6/2003 | Barsness | H04H 60/64 725/9 |
| 2003/0149975 A1* | 8/2003 | Eldering | H04N 7/17318 725/34 |
| 2004/0264918 A1* | 12/2004 | Turner | G06T 5/50 386/309 |
| 2005/0149964 A1* | 7/2005 | Thomas | G06Q 30/02 725/9 |
| 2006/0212900 A1* | 9/2006 | Ismail | H04H 60/06 725/34 |
| 2006/0218573 A1* | 9/2006 | Proebstel | H04H 60/33 725/14 |
| 2007/0124756 A1* | 5/2007 | Covell | G06F 17/30743 725/18 |
| 2007/0136753 A1* | 6/2007 | Bovenschulte | H04H 60/31 725/46 |
| 2007/0157260 A1* | 7/2007 | Walker | H04N 7/163 725/86 |
| 2009/0092374 A1* | 4/2009 | Kulas | H04N 7/173 386/248 |
| 2010/0180311 A1* | 7/2010 | Gordon | G06Q 30/0251 725/61 |
| 2011/0016479 A1* | 1/2011 | Tidwell | G06Q 30/02 725/9 |
| 2012/0278161 A1* | 11/2012 | Lazzaro | G06Q 30/0251 705/14.45 |
| 2013/0091515 A1* | 4/2013 | Sakata | H04N 17/04 725/10 |
| 2013/0326406 A1* | 12/2013 | Reiley | G06F 3/048 715/810 |
| 2015/0038337 A1* | 2/2015 | Liu | C12N 15/1034 506/2 |
| 2015/0186368 A1* | 7/2015 | Zhang | G06F 17/3082 707/740 |
| 2015/0235672 A1* | 8/2015 | Cudak | G11B 27/3081 386/241 |
| 2015/0350729 A1* | 12/2015 | Reynolds | H04N 21/4668 725/34 |

* cited by examiner

US 9,736,503 B1

OPTIMIZING TIMING OF DISPLAY OF A MID-ROLL VIDEO ADVERTISEMENT BASED ON VIEWER RETENTION DATA

RELATED APPLICATION

This application claims priority to U.S. Provisional Patent Application No. 62/049,818 filed on Sep. 12, 2014, and entitled "OPTIMIZING TIMING OF DISPLAY OF A MID-ROLL VIDEO ADVERTISEMENT BASED ON VIEWER RETENTION DATA." The entirety of the aforementioned application is incorporated by reference herein.

TECHNICAL FIELD

This application generally relates to systems and methods for optimizing the timing at which a mid-roll video advertisement is displayed based on viewer retention data.

BACKGROUND

The proliferation of available streaming video is increasing at exponential levels that will soon reach many billions if not trillions (or more) of such viewable streaming content. Content providers often provide free streaming video content to users in exchange for association of an advertisement with the video. For example, a pre-roll video advertisement is a short video advertisement that is automatically played before another video that has been selected for playing by a user. Another type of streaming video advertisement includes a mid-roll advertisement. A mid-roll advertisement is designed to play at some point within a video. Because a mid-roll video advertisement interrupts a user's viewing experience, the user often dismisses the original video at the time the mid-roll advertisement is played in order to avoid watching the mid-roll advertisement. Manually analyzing a video to strategically determine when to integrate a mid-roll video advertisement such that it does not prompt the user to prematurely dismiss the video can be difficult and time consuming.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
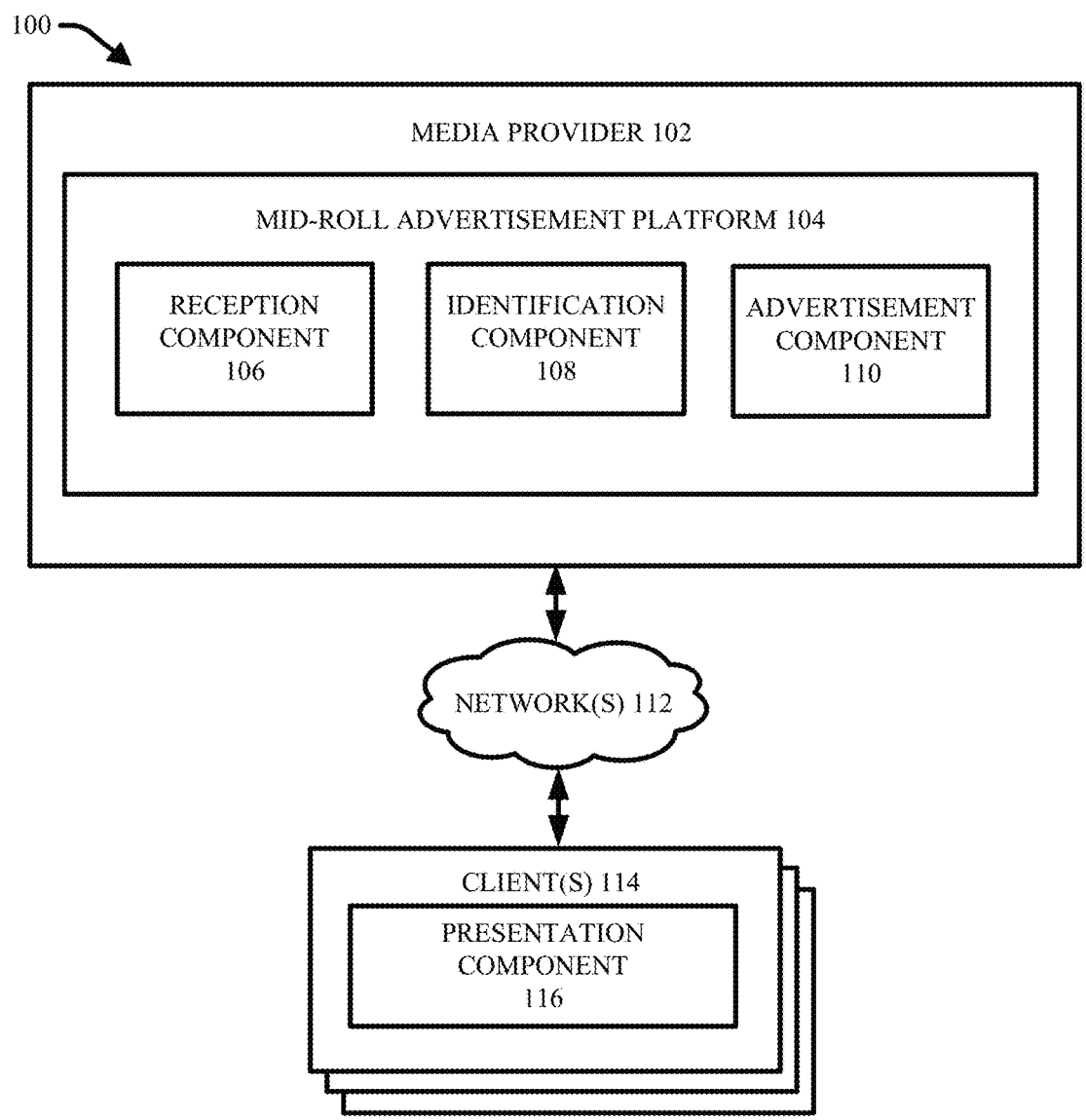
FIG. 1 illustrates an example system for optimizing the timing at which a mid-roll video advertisement is played based on viewer retention data in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for determining an optimal point or points in a video to integrate a mid-roll advertisement. Content providers often provide free streaming video content to users in exchange for association of an advertisement with the video. One type of such an advertisement includes a mid-roll video advertisement. A mid-roll video advertisement is designed to play at some point within a video and interrupt the user's viewing experience. For example, when a mid-roll video advertisement is played, the primary video is paused. After the mid-roll advertisement has finished playing or has been skipped (e.g., when the mid-roll video advertisement is skippable), the underlying video begins playing where it left off.

Due to their interruptive nature, mid-roll advertisements can deter a user's desire to continue his or her viewing experience. For example, unless the user is highly interested in the content following an interruptive mid-roll advertisement, the user may be inclined to abandon the video rather than watching the mid-roll video advertisement as a prerequisite to advance in the video. This scenario is a loss for the content provider, the video creator, and the advertiser. For the content provider and video creator, viewer retention is diminished due to the mid-roll advertisement. In addition, the video advertiser is at a loss because their advertisement is not seen in full or at all, and thus fails to provide any useful impression.

Accordingly, mid-roll type advertisements should be strategically integrated into a video at points where the viewer will be enticed to watch them. For example, in a traditional broadcast television competition based reality show, a mid-roll type advertisement is often inserted just before announcing the winner of the show. As a result, viewers are encouraged to watch the advertisement in order to continue watching the remainder of the show to find out who the winner is, as opposed to quitting the show all together due to the nuisance of the interrupting advertisement. In general, determining an optimal point in a video to integrate a mid-show advertisement in traditional broadcast television is a strategic and manual process requiring careful planning during and after video production.

However, unlike traditional broadcast media, videos intended for online streaming are not generally created with the mindset for integrating multiple advertisement breaks. Manually analyzing a video intended for online streaming to strategically determine where to integrate a mid-roll video advertisement can be time consuming for a user. Such a task becomes significantly arduous when a user desires to strategically integrate mid-roll advertisements into many different videos, such as a plurality of videos associated with a user profile or channel. Placing this burden on the streaming media provider is also unrealistic given the sheer number of videos offered and managed thereby. For example, one popular media streaming service receives about 100 million hours of uploaded new video content a minute!

The disclosed systems and methods employ viewer retention data to automatically identify an optimal point or points in a video at which to play a mid-roll video advertisement such that the user is encouraged to watch the mid-roll video advertisement and continue watching the remainder of the video following completion of the mid-roll video advertisement. As used herein, the term 'viewer retention data' refers to information that identifies amounts of viewers that have watched respective frames of a video. In an aspect, this retention data can be obtained from watch the histories of the many different users of a streaming media provider service that provides the streaming videos. For example, watch histories of a plurality of users that have selected a video for playing can be analyzed to identify segments or frames of the video that the respective viewers watch, segments or frames where the respective viewers stopped engaging with or watching the video (referred to herein as drop off points), and segments or frames where the respective viewers watch or re-engage with the video (e.g., after skipping forward to later parts of the video).

Based on this viewer retention data, segments of the video associated with high user interest relative to other segments of the video can be identified. For example, a segment of the video associated with steady viewership (e.g., as indicated by a small amount of viewers dropping off the video over the duration of the segment) and a relatively high amount of viewers (e.g., as measured in terms of number of viewers that watched the segment and/or number of viewers that watched the segment out of the total number of viewers that began watching the video) can be characterized as a high interest segment. In another example, a segment of a video associated with an increase in viewership (e.g., a segment viewers tend to skip forward to) can be attributed to the occurrence of an interesting or engaging part in the video. Such a segment can also be considered a high interest segment.

Based on the assumption that viewers will likely continue watching high a interest segment, these segments are targeted as points for integration of a mid-roll video advertisement. For example, a mid-roll video advertisement can be configured for playing just prior to the beginning of a high interest segment or in the middle of the high interest segment. In another example, a mid-roll video advertisement can be configured for playing between two neighboring high interest segments.

Depending on the length and content of a video, the video can include more than one high interest segment. Thus in an aspect, when a video includes multiple high interest segments, the high interest segments can be further analyzed to identify a subset of the high interest segments that are best suited for integration of a mid-roll video advertisement. For example, when a video includes a plurality of high interest segments, those high interest segments associated with a greater amount of viewers than other high interest segments can be identified as optimal candidates for association with a mid-roll video advertisement. In another example, those high interest segments having a longer duration of steady viewership relative to other high interest segments can be ranked as better candidates for association with a mid-roll video advertisement.

In yet another example, high interest segments located near the midpoint of the video can be considered better candidates for association with a mid-roll video advertisement as opposed to high interest segments located near the beginning or end of the video. For instance, new viewers generally tend to stop watching a video near the beginning because it may not be what they expected. Thus if a mid-roll video advertisement is shown near the beginning of a video and the viewer is already considering dismissing the video, the user will be more inclined to dismiss the video based on the playing of the mid-roll video advertisement. Also, if a mid-roll video advertisement is played near the end of a video and the viewer feels they have seen enough without needing to finish the video, the mid-roll video advertisement will likely prompt the user to dismiss the video in order to avoid watching the mid-roll video advertisement. Therefore, high interest segments occurring in the middle of a video are generally more preferable points for integration of a mid-roll video advertisement over segments occurring near the beginning or end of a video.

In one or more aspects, a system is provided that includes a reception component configured to receive viewer retention information for a video, the viewer retention information indentifying amounts of viewers that have watched respective frames of the video, an identification component configured to identify high interest segments of the video based on analysis of the viewer retention information, wherein the high interest segments are associated with relatively higher viewer interest over other segments of the video. The system further includes an advertisement component configured to select a point to insert a mid-roll advertisement during playback of the video at or near at least one of the high interest segments.

In another aspect, a method is provided that includes using a processor to execute the computer executable instructions stored in a memory to perform the various acts. These acts include receiving viewer retention information for a video, the viewer retention information indentifying amounts of viewers that have watched respective frames of the video, identifying high interest segments of the video based on analysis of the viewer retention information, wherein the high interest segments are associated with relatively higher viewer interest over other segments of the video, and selecting a point to insert a mid-roll advertisement during playback of the video at or near at least one of the high interest segments.

In yet another aspect, a tangible computer-readable storage medium comprising computer-readable instructions that, in response to execution, cause a computing system to perform various operations. These operations can include identifying high interest segments of a video based on analysis of viewer retention information that identifies amounts of viewers that have watched respective frames of the video, wherein the identifying comprises identifying segments of the video respectively associated with a relatively steady and high amount of viewers relative to the other segments of the video, and selecting a point to insert a mid-roll advertisement during playback of the video at or near at least one of the high interest segments.

Referring now to the drawings, with reference initially to FIG. 1, presented is a diagram of an example system 100 for optimizing the timing at which a mid-roll video advertisement is played based on viewer retention data, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes media provider 102, one or more client devices 114 and one or more networks 112 for connecting the one or more client devices 114 with media provider 102. Media provider 102 includes mid-roll advertisement platform 104 to facilitate optimizing the timing at which a mid-roll video advertisement is played during a video. Generally, media provider 102 and client devices 114 can include memory that stores computer executable components and a processor that executes the computer executable components stored in the memory, examples of which can be found with reference to FIG. 9.

Media provider 102 can include an entity configured to provide streaming media (e.g., video, live video, animations, audio, music, etc.) to users at their respective client devices 114 via a network 112. The streaming media can be accessed by the respective users via their respective client devices at a network based platform (e.g., a website or a thin mobile application) employed by the streaming media provider. For example, media provider 102 can include an Internet based media sharing service configured to allow users to upload and share media content. Media provider 102 can stream the media content to client devices 114 for playing at the client device 114 (e.g., via presentation component 116) in response to a request for the media content. In an aspect, in association with streaming of requested media content, media provider 102 can stream mid-roll video advertisements at one or more points during the requested media content. These mid-roll video advertisements are configured to interrupt the playing of the requested media content at the client device 114. For example, at a strategically selected point during the playing/streaming of a requested video, presentation component 116 can receive and play a mid-roll advertisement as opposed to the requested video. The requested video can be automatically paused during the playing of the mid-roll video advertisement and continue playing following the mid-roll advertisement.

In an aspect, media provider 102 has access to a voluminous quantity (and potentially an inexhaustible number) of shared media (e.g., video and/or audio) files for streaming to client devices 114 on demand. The media can be stored in memory associated with the media provider 102 and/or at various servers employed by the media provider and accessed by client devices 114 using a networked platform (e.g., a website platform, a mobile application, etc.) employed by the media provider 102.

The term media content or media item can include but is not limited to streamable media (e.g., video, live video, video advertisements, animations, music, music videos, sound files and etc.) and static media (e.g., pictures, thumbnails). The term media content or media item includes a collection of media items such as a playlist including several videos or songs, or a channel including several videos or songs associated with a single media creator or curator. A channel can include data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

Client devices 114 can include any suitable computing device associated with a user and configured to interact with media provider 102. For example, a client device 114 can include a desktop computer, a laptop computer, a television, an Internet enabled television, a mobile phone, a smartphone, a tablet personal computer (PC), or a personal digital assistant PDA. A client device 114 can include presentation component 116 to generate a user interface (e.g., a graphical user interface or virtual interface) that displays media content provided by media provider 102 to a user of the client device 114. In particular, presentation component 116 can play videos and associated mid-roll advertisements provided by media provider 102 as streamed to client device 114. In an aspect, presentation component 122 can include an application (e.g., a web browser) for retrieving, presenting and traversing information resources on the World Wide Web. For example, media provider 102 can provide and/or present media content to a client device 114 via a website that can be accessed using a browser of the client device 114. In an aspect, the media content can be presented and/or played at client device 114 using a video player associated with media provider 102 and/or the client device 114

As used in this disclosure, the terms "content consumer," "user," "viewer," or "participant" refers to a person, entity, system, or combination thereof that employs system 100 (or additional systems described in this disclosure) using a client device 114. Networks 112 can include wired and wireless networks, including but not limited to, a cellular network, a wide area network (WAD, e.g., the Internet), a local area network (LAN), or a personal area network (PAN). For example, a client device 114 can communicate with media provider 102 and/or another client device (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

To facilitate identifying an optimal point or points in a video to play a mid-roll video advertisement, mid-roll advertisement platform 104 can include reception component 106, identification component 108, and advertisement component 110. Reception component 106 is configured to receive viewer retention information regarding amounts (e.g., in absolute number or relative percentages) of viewers that have watched respective parts of a video. For example, viewer retention information for a video can identify respective frames/segments of the video that respective users of a plurality of users watched, including points or frames of the video where the respective users began watching, points or frames where the respective users stopped watching, and/or points or frames of the video that the respective users skipped forward/backward to, skipped over, and/or re-watched.

Viewer retention information can identify the number of users that began watching a video and points in the video where the respective users stopped watching the video, referred to herein as a drop off point. In an aspect, viewer retention information can reflect relative percentages of viewers that watched a particular segment or frame of a video out of the number of viewers that began watching the video. For example, 100% of the viewers may watch the first couple frames of the video, yet by frame number N, only 60% of the viewers may remain. In another aspect, viewer retention information can reflect the absolute number of viewers to have watched any given segment or frame of a video. For example, 100 viewers may watch frames 1-25, 30 viewers may watch frames 26-55, and 60 viewers may watch frames 56-85.

The term video segment refers to a portion of a video less than the whole video. The term video frame refers to one of the plurality of sequential images which compose the complete moving picture of a video. Thus in an aspect, a video frame is a video segment. However, as generally used herein, the term video segment refers to a portion of a video including two or more sequential video frames. For example, a video segment can include a portion of a video including frames numbers 1-24, 100-200, or 1-240. In another example, a video segment can be identified as a portion of a video between two time markers $T_A$ and $T_B$ (e.g., segment T—13:05 to T—16:21).

Figure 2:
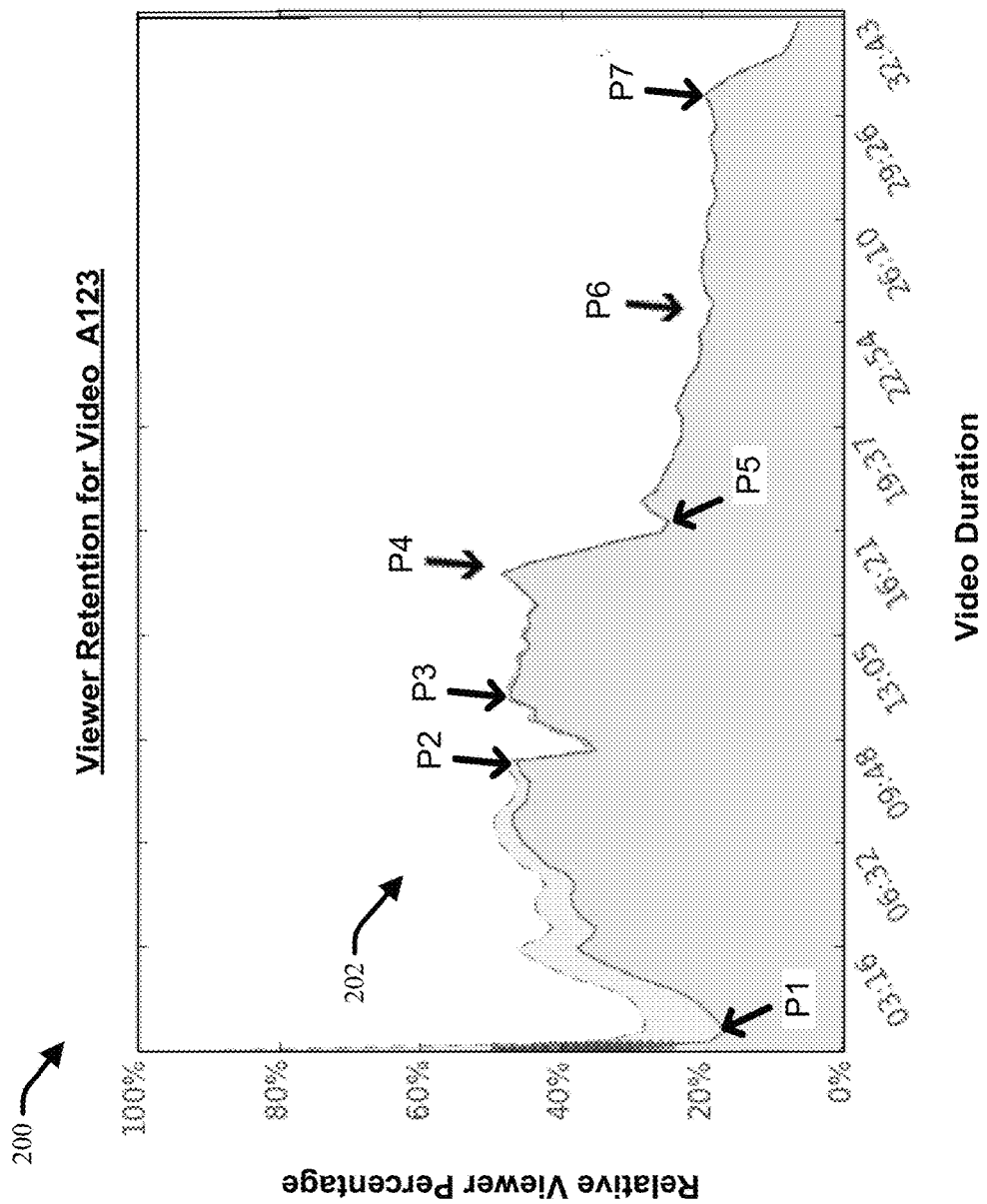
FIG. 2 illustrates a graphical depiction of a viewer retention curve in accordance with various aspects and embodiments described herein.

FIG. 2 provides a graphical depiction 200 of viewer retention information for a particular video identified as video A123. The graphical depiction 200 includes what is referred to herein as a viewer retention curve 202. A viewer retention curve is a graphical representation of viewer retention information based on a plurality plotted points corresponding to number or percentages of viewers that watched a video at respective points in the video over the duration of the video. As seen in FIG. 2, the horizontal or x-axis corresponds to the video duration, (e.g., or sequential points throughout the video duration) and the vertical or y-axis corresponds to relative percentages of viewers that watched the video.

A typical viewer retention curve starts at about 100% viewership at time 0:01, then starts dropping off over the duration of the video, (initially stronger due to people who expected something else, or were buffering for the video too long and gave up, etc). As the video progresses and viewership drops off, the plotted retention curve will slope downward to indicate points in the video where viewers tend to stop engaging with or watching a video. During boring parts of the video, the retention curve can drop and then recover later since viewers often seek forward and thus skip the boring parts.

For example, assuming at time 0:01 video A123 had 100% relative viewership, at point P1 (e.g., about time 01:00), video A123 had about 20% relative viewership (e.g., meaning by time P1, 80% of the initial viewers dropped off). Between points P1 and P4 however, viewership increased to about 50%. For example, viewers may have joined or re-joined the video over the video duration between P1 and P4. After point P4, the viewership drops rather sharply (e.g., from about 50% viewership at point P4 to about 25% viewership at point P5). Between points P5 and P7 however, viewership remains rather steady, holding at between about 20-25% for about 13 minutes.

Referring back to FIG. 1, a viewer retention curve for a video (e.g., such as viewer retention curve 202) can provide a good indication of which parts of the video could be considered "interesting" or "boring." Accordingly, based on received viewer retention information for a video, identification component 108 is configured to identify segments of the video associated with higher user interest than other segments of the video. Such segments are referred to herein as high interest segments.

In an aspect, identification component 108 can analyze viewer retention information for a video and determine or infer high interest segments based on association with a relatively steady and high amount of viewers with respect to the other segments of the video. When analyzing a viewer retention curve for a video, segments associated with a relatively steady amount of viewers will be relatively flat (e.g., horizontal or without a steep decline) with minimal peaks and valleys. A relatively flat period on a viewer retention curve can indicate that viewers were engaged/interested in the video over the duration of the period and were not dropping off. Accordingly, identification component 108 can analyze a viewer retention curve (e.g., the data from which the viewer retention curve can be generated) to identify one or more relatively flat segments and characterize these one or more segments as high interest segments.

For example, referring back to FIG. 2, the portions of retention curve 202 between points P3 and P4 as well as P5 and P7 are relatively flat when compared with other portions of the retention curve. In other words, the portions of the retention curve between points P3 and P4 as well as P5 and P7 maintain a relatively steady percentage of viewers without significant variation. This is an indication that viewers do not tend to drop off the video over these respective segments. Accordingly, identification component 108 can characterize these segments as high interest segments.

In an aspect, identification component 108 can determine what constitutes a relatively steady amount of viewers based on a standard deviation threshold from a mean viewer amount for the high interest segment over a minimum segment length (e.g., a minimum duration of frames or a minimum time period). For example, identification component 108 can apply a standard deviation threshold of X percent for a minimum segment duration $D_m$. According to this example, identification component 108 can characterize all segments of a video that pass these threshold viewer variance/duration requirements as being high interest segments. For instance, where the deviation threshold is 5% and the minimum segment duration is 5 minutes, segments P3-P4 and P5-P7 can be characterized as high interest segments. On the other hand, where the deviation threshold is 5% and the minimum segment duration is 10 minutes, only segment P5-P7 can be characterized as high interest segment.

In addition to association with a relatively steady percentage of viewership for a minimum segment length, amount of viewership can also influence characterization of a segment of video as a high interest segment. In particular, the more viewers that tend to find a segment of a video engaging (e.g., as implied by their watching of the segment, their re-watching of the segment, their skipping forward/backward to the segment, etc), the better indication that the segment is a high interest segment. Thus identification component 108 can also apply a minimum viewership threshold for a video segment to qualify as a high interest segment. For example, identification component 108 can require an average relative viewership level for a segment to be greater than or equal to Y % (e.g., 10%, 20%, 25%, etc.). In another example, identification component 108 can require an average absolute viewership number (e.g., at least M number of viewers) associated with the segment prior to characterization as a high interest segment. In an aspect, viewership amount threshold requirements can vary based on total number of views associated with the video. For example, a video that has been viewed by 100 viewers can have a lower viewership amount threshold for classification as a high interest segment relative to a video viewed by 10,000 viewers.

In an aspect, threshold requirements for segment length, viewership amount and/or viewership variance, associated with classification of a video segment as a high interest segment can vary based on characteristics of the video including but not limited to, length of the video and type of the video. For example, shorter videos can require a shorter minimum segment length associated with steady viewership to be characterized as a high interest segment over longer videos. In another example, videos having a high amount of total views (e.g., more than 100,000 views), can employ a minimum absolute viewer threshold for a segment as opposed to a relative viewership threshold. In another example, identification component 108 can set viewership thresholds as a function of meeting at least one of a minimum relative viewership threshold or an absolute viewership threshold (e.g., at least 25% relative viewership or 10,000 viewers).

Type or genre of the video, (e.g., such a music video, a sports video, a show, a movie, a news video, etc.) can also influence threshold standard deviation and segment length requirements. In particular, the retention curve for a video can be characterized by different types of patterns depending on the type of the video. For example, retention curves of music videos generally have a constant steady drop-off rate over the course of the video with few sharp drops. Sports related videos can have varying peaks and drops over the course of the video as viewers often tend to seek forwards/backwards to certain scenes, skip over boring parts, and/or re-watch interesting parts. Shows (e.g., videos 30 to 60 minutes) are often characterized by long durations of steady viewership after an initial drop off period because viewers tend to remain quite engaged with the content once they've been hooked. Movies (e.g., videos longer than 60 minutes) can have similar retention curves as shows, however movies are associated with a higher and more drastic initial drop-off since many people may not want to commit to such a long video. Accordingly, threshold standard deviation and segment length requirements can be vary based on a type of characterization of the video. For example, the standard deviation requirement associated with steady viewership for a show or movie can be smaller (e.g., more strict) than the standard deviation requirement for a music video or a sports program.

In another aspect, rather than applying strict threshold requirements for segment length, viewership amount and viewership variance, identification component 108 can balance these factors when characterizing a segment as a high interest segment. The balancing weights applied to these factors can also vary based on type of video and length of video.

Identification component 108 can also characterize segments of a video associated with increasing viewership as high interest segments. For example, a part of a video that viewers tend to skip forward to is generally associated with an increase in viewership. Accordingly, the portion of the video preceding the increase in viewership can be considered a less interesting segment. According to this aspect, referring back to FIG. 2, identification component 108 can characterize segment P1-P2 of retention curve 202 as a high interest segment due to association with an increase in viewership.

In an aspect, identification component 108 can analyze viewer retention data for a video that has been filtered based on various audience related features. According to this aspect, identification component 108 can identify high interest segments for the video that pertain to a particular audience associated with a particular feature or set of features. For example, identification component 108 can identify high interest segments of a video (e.g., using the various techniques discussed above) based on viewer retention data for the video that includes only viewers from a particular demographic (e.g., age, gender, location, language, etc.), having a particular content preference, associated with a particular social circle, having a particular status (e.g., top fans), or that have seen the video before (e.g., once before, twice before, etc.). In another example, identification component 108 can identify high interest segments of a video based on viewer retention data for the video that includes only viewers that employ a particular device type (e.g., mobile device users vs. desktop users), or viewers that viewed the video at a remote embedded network location (e.g., at a social media website where the video, provided by media provider 102, was embedded).

According to this aspect, the segments of a video identified as high interest segments can vary depending on audience characteristics because the retention curve also vary depending on the audience characteristics. For example, a younger audience may find segment defined as point A to point B (pA-pB) boring while an older audience may find segment pA-pB interesting. Thus in an aspect, identification component 108 can identify and classify high interest segments of a video with respect to a general viewership population and/or various viewership sub-populations.

Advertisement component 110 is configured to determine one or more points in a video to play a mid-roll advertisement, referred to herein as mid-roll advertisement points, based on user interest associated with respective segments of the video as determined or inferred in part by identification component 108. In particular, advertisement component 110 is configured to select one or more points to insert a mid-roll advertisement during playback of the video at or near at least one of the high interest segments identified by identification component 108. In an aspect, in response to determination of a mid-roll advertisement point or points in a video, advertisement component 110 can tag the point(s), generate a index that indexes the mid-roll advertisement point(s) for the video, or otherwise generate and store information that identifies the mid-roll advertisement point(s) for the video. When the video is later requested for streaming to a client device 114, advertisement component 110 can effectuate streaming and playing of a mid-roll advertisement at the appropriate mid-roll advertisement point or points.

In general, media provider 102 prefers to show a mid-roll advertisement during a video where viewers will be enticed to watch the advertisement (e.g., not drop off as soon as advertisement plays). If a mid-roll advertisement is shown where viewers tend to drop off, the advertisement is likely to spark additional user drop off and those users who drop off will simply end the video to avoid watching the advertisement. Accordingly, advertisement component 110 is configured to identify points in a video where viewers tend to remain interested in the video and show a mid-roll advertisement at or near these points. Such points can occur during or near the one or more high interest video segments as determined by identification component 108.

In an aspect, advertisement component 110 is configured to select a point to insert a mid-roll advertisement during playback of the video at or near a high interest segment of the video as identified by identification component 108. For example, advertisement component 110 can be configured to select a point immediately preceding the high interest segment as a mid-roll advertisement point. In another example, advertisement component 110 can select a point within a high interest segment as a mid-roll advertisement point. For instance, advertisement component 110 can select the midpoint of a high interest segment as a mid-roll advertisement point, a point within and near the beginning of the high interest segment (e.g., the first quarter or third of the high interest segment), or a point within and near the end of the high interest segment (e.g., the last quarter or third of the segment).

For example, with reference to FIG. 2, at point P4 of retention curve 202, viewers tend to drop off, as evinced by the sharp decline following point P4. Accordingly, point P4 would be a bad spot to insert a mid-roll advertisement as those viewers who drop off would likely not watch the mid-roll advertisement and simply exit the video and those viewers who were considering dropping off but didn't may have been swayed to drop off if a mid-roll advertisement was played. On the other hand, as seen by examining retention curve 202 those viewers who did not drop off at point P4 remained interested in the video over the duration of segment P5-P7, as evinced by the relatively steady/flat appearance of the curve. Accordingly, placing a mid-roll advertisement in the middle of this segment (e.g., at point P6) would be a good mid-roll advertisement point in light of the assumption that the remaining engaged users would actually watch the advertisement over dropping off and continue watching the remainder of the engaging content after completion of the mid-roll video advertisement.

Referring back to FIG. 1, when identification component 108 identifies and classifies high interest segments of a video associated with various viewership sub-populations, advertisement component 110 can also identify specific mid-roll advertisement insertion points for the video that are tailored to respective viewership sub-populations. Accordingly, a plurality of different mid-roll advertisement insertion points can be identified for a video wherein each of the different mid-roll advertisement points are associated with a particular audience type. When the video is played, advertisement component 110 can determine the audience to which it is played and then select the appropriate mid-roll advertisement point, from the plurality of identified mid-roll advertisement points, to integrate a mid-roll advertisement based on the audience to which it will be presented. In furtherance to the example above, when identification component 108 identifies segment PA-PB as a high interest segment for an older viewership population and not a high interest segment for a younger viewership population, advertisement component 110 can tag a point at or near segment PA-PB as a mid-roll advertisement insertion point only for older audiences. When the video is requested and presented to an older audience, advertisement component 110 can effectuate streaming of a mid-roll advertisement at the tagged point at or near segment PA-PB. However, when the video is requested and presented to a younger audience, advertisement component 110 can prevent streaming of a mid-roll advertisement at the tagged point at or near segment PA-PB and select a different mid-roll advertisement point to stream the mid-roll advertisement.

Figure 3:
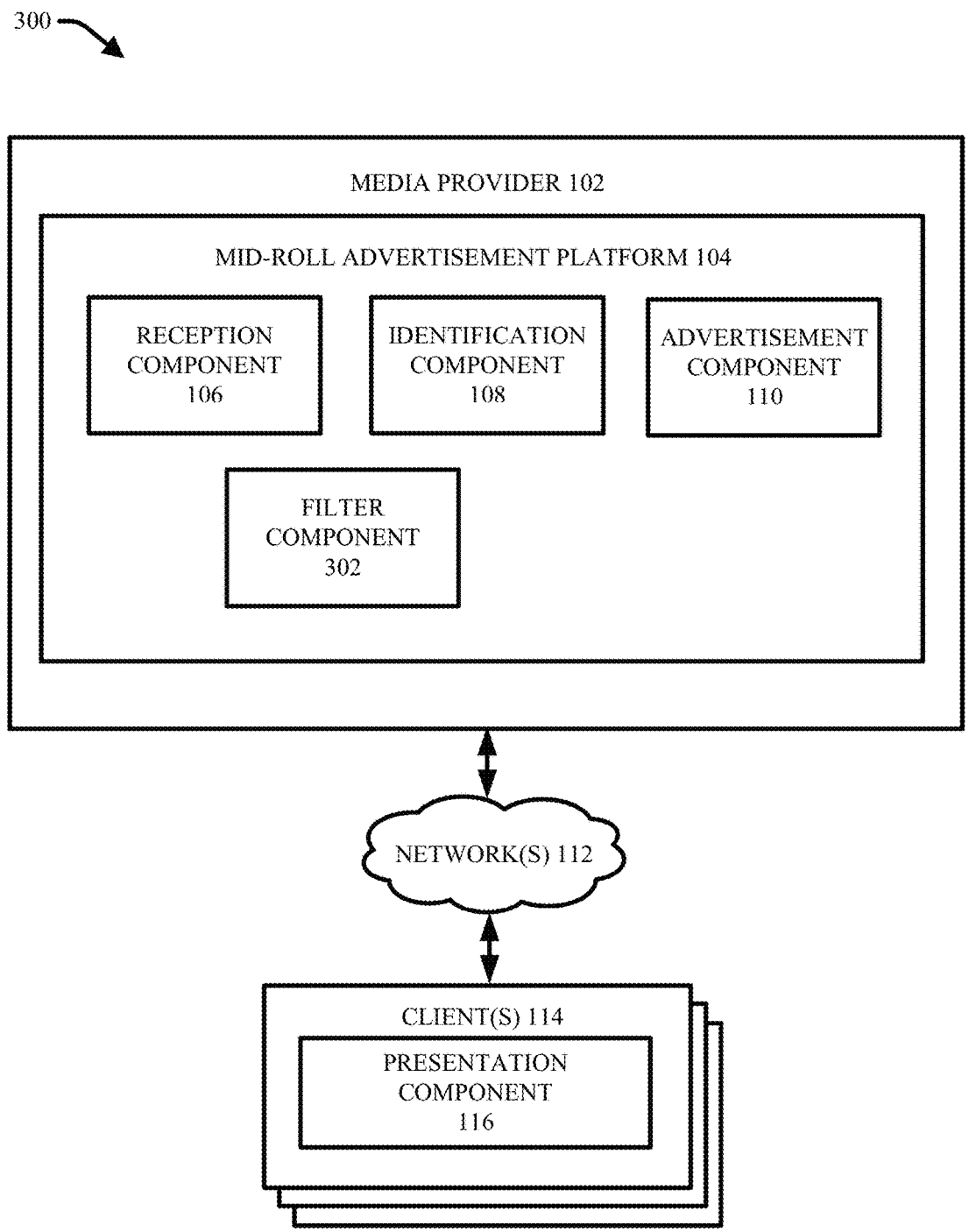
FIG. 3 illustrates another example system for optimizing the timing at which a mid-roll video advertisement is played based on viewer retention data in accordance with various aspects and embodiments described herein.

FIG. 3 presents a diagram of another example system 300 for optimizing the timing at which a mid-roll video advertisement is splayed based on viewer retention data, in accordance with various aspects and embodiments described herein. System 300 includes same features and functionalities as system 100 with the addition of filter component 302 to mid-roll advertisement platform 104. Repetitive description of like elements employed in respective embodiments of systems and interfaces described herein are omitted for sake of brevity.

As previously described, in various embodiments a video can include multiple high interest segments (as identified by identification component 108) that are suitable for associating with a mid-roll advertisement (e.g., for a general audience or a specific sub-population of the general audience). Thus in some embodiments, advertisement component 110 can also identify multiple mid-roll advertisement points for each of the identified high interest segments or employ a filtering process to select a subset (e.g., one or more) of the high interest segments to tag with mid-roll advertisement insertion points. According to these embodiments, filter component 302 is configured to apply various filters against a set of high interest segments of a video as identified by identification component 108 to facilitate determination, by advertisement component 110, of an optimal point for inserting a mid-roll advertisement during playback of the video.

In an aspect, filter component 302 can identify a subset (e.g., one or more) of a set of high interest segments identified by identification component 108 based on at least one of: segment length, segment viewership amount, segment viewership variance, segment slope, segment location, video length, and video type. For example, filter component 302 can compare the lengths or durations of each of the high interest segments in the set and select a subset of the high interest segments that have relatively longer lengths then other ones of the high interest segments. For instance, filter component 302 can select one of the high interest segments of the set having the longest length or the top N (e.g., top 2, top 3, etc.) high interest segments having the longest length. In another example, filter component 302 can compare amounts of viewers (e.g., relative or absolute) associated with of each of the high interest segments in the set and select a subset of the high interest segments that have relatively greater amounts of viewers then other ones of the high interest segments. For instance filter component 302 can select one of the high interest segments of the set associated with a greatest amount (e.g., absolute or relative to total viewers to have began watching the video) of viewers or the top N (e.g., top 2, top 3, etc.) high interest segments having the most viewership. According to this example, it is preferable to associate a mid-roll advertisement with a high interest segment associated with 50% of retained viewers over a high interest segment where only 5% of the initial viewers so as to provide more exposure for the advertisement.

In another example, filter component 302 can compare viewership variance for the respective high interest segments (e.g., based on respective degrees of deviation from mean viewership amounts for the respective segments) and select a subset of the high interest segments that have a smaller degree of variance. In other words, filter component 302 can select a subset of the high interest segments represented by a retention cure that are associated with straighter or flatter (e.g., fewer peaks and valleys) and horizontal line formation. According to this example, filter component 302 can apply a filter that values high interest segment having a substantially horizontal slope over segments having an increasing or decreasing slope. However, in some instances (e.g., based on video type, video length, amount of viewers associated with respective high interest segments of a subset, etc.), filter component 302 can apply a filter that affords preference to high interest segments associated with an increasing slope over segments having a decreasing slope and/or a horizontal slope.

In yet another example, filter component 302 can compare the positions of each of the high interest segments in a set of high interest segments (e.g., as identified by identification component 108) relative to the beginning and the end of the video and select a subset of the high interest segments that are nearer to a midpoint of the video. According to this example, filter component 302 can consider segments located closer to the midpoint of the video as more optimal locations for integration of a mid-roll video For example, if a mid-roll video advertisement is shown too early in the video, users may not be invested enough in the video content and choose to abandon the video due to the playing of a mid-roll advertisement. Likewise, if a mid-roll video advertisement is shown too late in the video and the user is satisfied with what he or she has seen already (e.g., the user feel she or he has "seen enough"), the user may be inclined to abandon the video due to the playing of the mid-roll advertisement.

In an aspect, filter component 302 can employ various algorithms that factor (e.g., apply different weights) to high interest segment length, high interest segment viewership amount, high interest segment viewership variance, high interest segment location, high interest segment slope (increasing, flat, or decreasing), number of high interest segments, relative locations of high interest segments to one another, and video length, to determine an optimal subset (e.g., one or more) of a set of high interest segments of a video for association with a mid-roll video advertisement. For example, filter component 302 may choose a high interest segment having a short duration/length than another high interest segment yet associated with a greater amount of viewers (e.g., segment P3-P4 over segment P5-P7 of retention curve 202 o in FIG. 2).

Filter component 302 can also factor the type of the video when identifying a subset of optimal high interest segments for association with a mid-roll video advertisement. For example, in a sports related video where a game culminates with a tight race for the winner, a high interest segment near the end of the video would be a good point to integrate a mid-roll advertisement. This is because even though it is near the end of the video, viewers are not likely to miss the final play to discover the winner. Accordingly, for a sports video, filter component 302 can be configured to employ an algorithm that is tailored to provide less emphasis on segment location near the middle of the video and/or imparts positive weight selection on segment location near the end of the video. In another example, integration of a mid-roll advertisement at a relatively high interest segment near the end of a music video would likely be less resourceful. This is because a user may decide they have heard enough of the song at the point where the mid-roll advertisement appears and thus choose to abandon the video to avoid watching the advertisement. Accordingly, for a music video, filter component 302 can be configured to employ an algorithm that is tailored to apply a positive weight for segment location near the end of the middle of the video and negative weight for segment location near the end of the video.

Thus in an aspect, filter component 302 can determine a type of a video analyzed by mid-roll advertisement (e.g., sports, music, movie, show, news, blog, reality, comedy, action, etc.) and employ an algorithm particularly tailored to the video type that applies specific weights and relationships between the following factors: segment length, segment viewership amount, segment viewership variance, segment location, and segment slope, to determine an optimal subset (e.g., one or more) of a set of high interest segments for association with a mid-roll video advertisement. In an aspect, based on outputs of the algorithm, filter component 302 can rank respective high interest segments of a video based on degree of suitability for association with a mid-roll video advertisement (e.g., from best to worst).

After filter component 302 has identified a subset (e.g., one or more) of a set of high interest segments of a video that are considered the most optimal high interest segments for association with a mid-roll video advertisement, advertisement component 110 can then associate a mid-roll advertisement point with one or more of the identified high interest segments of the subset. For example, filter component 302 can be configured to select one high interest segment out of a set of high interest segments that is considered the most optimal segment for integration of a mid-roll advertisement. Advertisement component 110 can then determine a point at or near (e.g., just preceding or within) the selected high interest segment as the mid-roll advertisement integration point. In another example, filter component 302 can be configured to select the top N (e.g., where N is 2 or more) high interest segments out of a set of high interest segments that are considered the most optimal segments for integration of a mid-roll advertisement. Advertisement component 110 can then determine N points at or near (e.g., just preceding or within) the selected high interest segments as a mid-roll advertisement integration point.

In an aspect, advertisement component 110 can further determine where to select an advertisement integration point in relation to a filtered high interest segment (e.g., immediately preceding, immediately following, within the high interest segment, in the middle of the high interest segment, within and near the beginning of the high interest segment, within and near the end of the high interest segment, etc.), based on at least one of: segment length, segment viewership amount, segment viewership variance, segment slope, segment location, video duration, and type of video.

In an aspect, depending on video type (e.g., sports based videos), filter component 302 can be particularly configured to select two high interest segments out of a set of high interest segments that neighbor (e.g., or sandwich) an adjacent low interest segment (e.g., as characterized by low and declining viewership). This could indicate that users have watched an interesting part and are about to continue to another interesting video segment. For instance, in a sports based video, this retention pattern could indicate a break period. According to this example, advertisement component 110 can choose a mid-roll advertisement point during the low interest segment that is sandwiched by the two filtered high interest segment. In an aspect, advertisement component 110 can be configured to select a point immediately following the first sequential segment of the two high interest segments or immediately preceding the second sequential segment of the two high interest segments as a mid-roll advertisement point.

Figure 4:
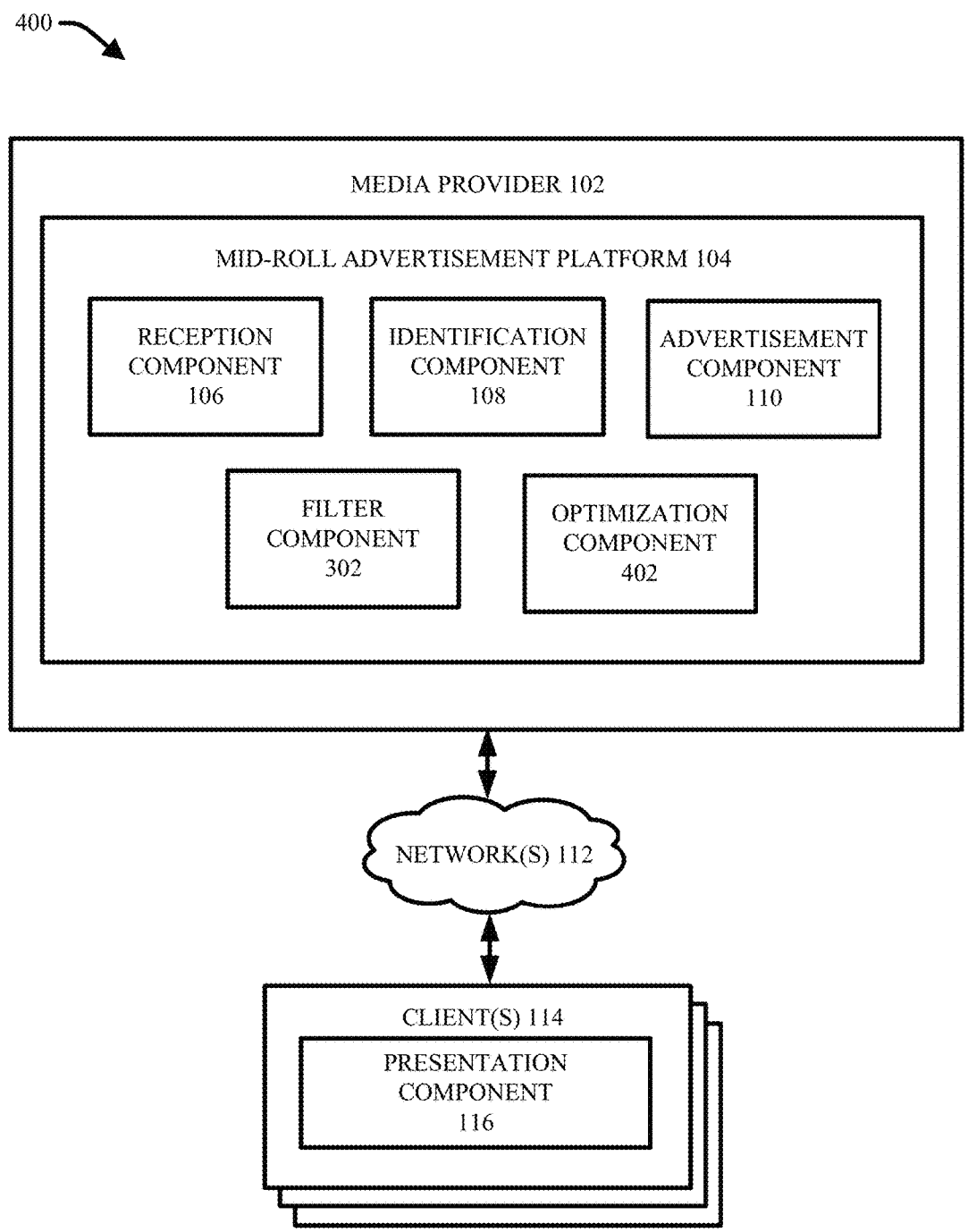
FIG. 4 illustrates another example system for optimizing the timing at which a mid-roll video advertisement is played based on viewer retention data in accordance with various aspects and embodiments described herein.

FIG. 4 presents a diagram of another example system 400 for optimizing the timing at which a mid-roll video advertisement is played based on viewer retention data, in accordance with various aspects and embodiments described herein. System 400 includes same features and functionalities of system 300 with the addition of optimization component 402 to mid-roll advertisement platform 104. Repetitive description of like elements employed in respective embodiments of systems and interfaces described herein are omitted for sake of brevity.

In an aspect, optimization component 402 is configured to run a gradient ascent learning mechanism on individual videos to optimize the timing of integration of a mid-roll advertisement into the respective videos with respect to increasing or maintaining viewership retention during and after playing of the mid-roll advertisement and/or advertisement conversion. For example, optimization component 402 can experiment with different insertion points for playing a mid-roll video advertisement during playback of a video and evaluate the effect of playing the mid-roll advertisement at the different insertion points with respect to viewership retention during and after playing of the mid-roll advertisement and/or advertisement conversion. According to this example, the different insertion points can be selected based on the various parameters described herein employed to identify high interest segments and points associated with those high interest segments. Optimization component 402 can then select a subset (e.g., one or more) of the different insertion points that are associated with the highest viewership retention during and after playing of the mid-roll advertisement and/or the highest advertisement conversion rate as a final mid-roll advertisement insertion point.

Figure 5:
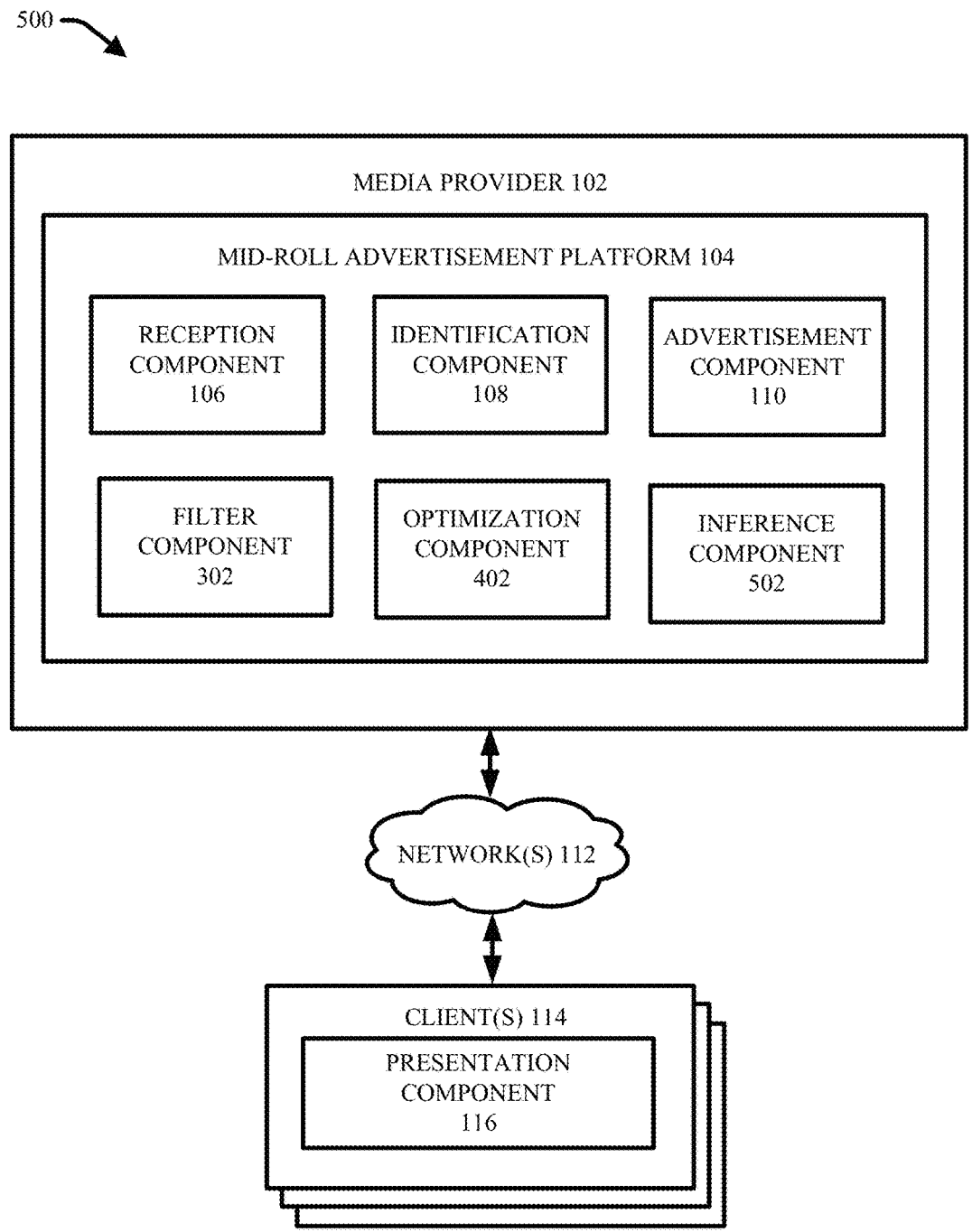
FIG. 5 illustrates another example system for optimizing the timing at which a mid-roll video advertisement is played based on viewer retention data in accordance with various aspects and embodiments described herein.

FIG. 5 presents a diagram of another example system 500 for optimizing the timing at which a mid-roll video advertisement is displayed based on viewer retention data, in accordance with various aspects and embodiments described herein. System 500 includes same features and functionalities of system 400 with the addition of inference component 502 to mid-roll advertisement platform 104. Repetitive description of like elements employed in respective embodiments of systems and interfaces described herein are omitted for sake of brevity.

Inference component 502 is configured to provide for or aid in various inferences or determinations associated with aspects of media provider 102. In an aspect, all or portions of media provider 102 can be operatively coupled to inference component 502. Moreover, inference component 502 can be granted access to all or portions of media provider, client device(s) 114 and other sources accessible via a network 112.

In an aspect, identification component 108 can employ inference component 502 to facilitate identifying segments of a video associated with relatively higher user interest than other segments of the video based on viewer retention information. In another aspect, advertisement component 110 and/or optimization component 402 can employ inference component 502 to infer a subset of a set of high interest segments, and one or more points associated with the subset of high interest segments, that are best suited for integration of a mid-roll advertisement with respect to increasing or maintaining viewership retention and/or increasing advertisement conversion. In association with such inferences, inference component 502 can examine features associated with the video (e.g., video type, video duration, total number of view, etc.) and features associated with the respective high interest segments (e.g., segment length, segment viewership amount, segment viewership variance, segment location, and segment slope (increasing, flat, or decreasing)).

In order to provide for or aid in the numerous inferences described herein, inference component 502 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
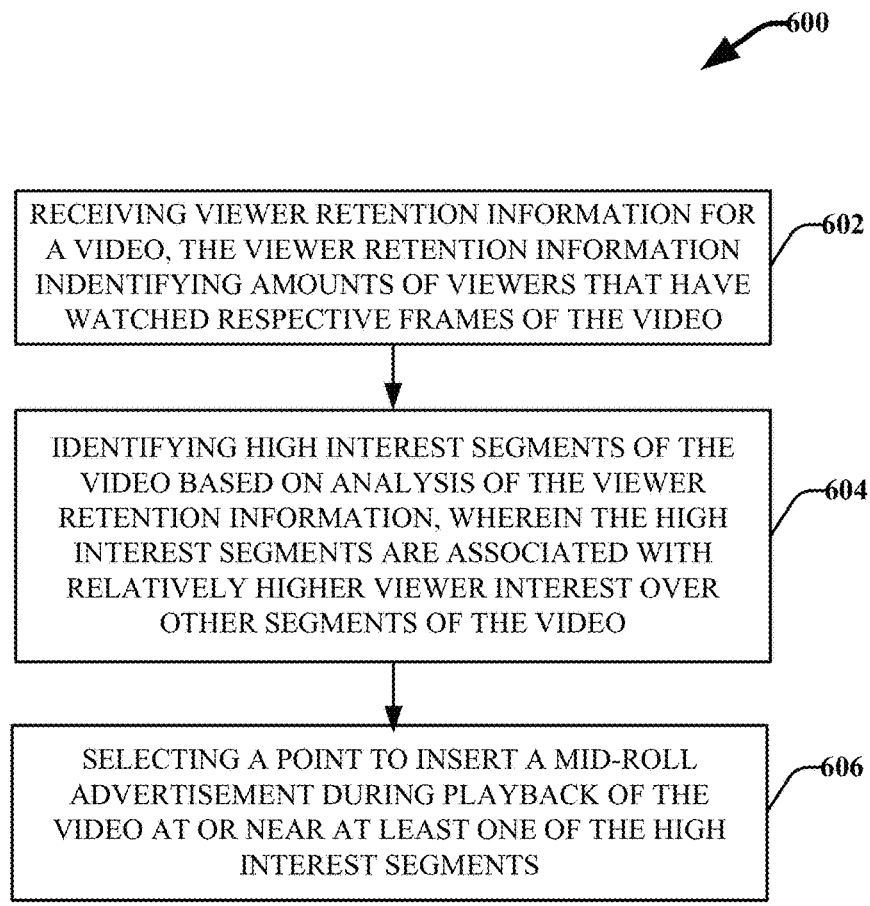
FIG. 6 presents a flow diagram of an example method for optimizing the timing at which a mid-roll video advertisement is played based on viewer retention data in accordance with various aspects and embodiments described herein.
Figure 7:
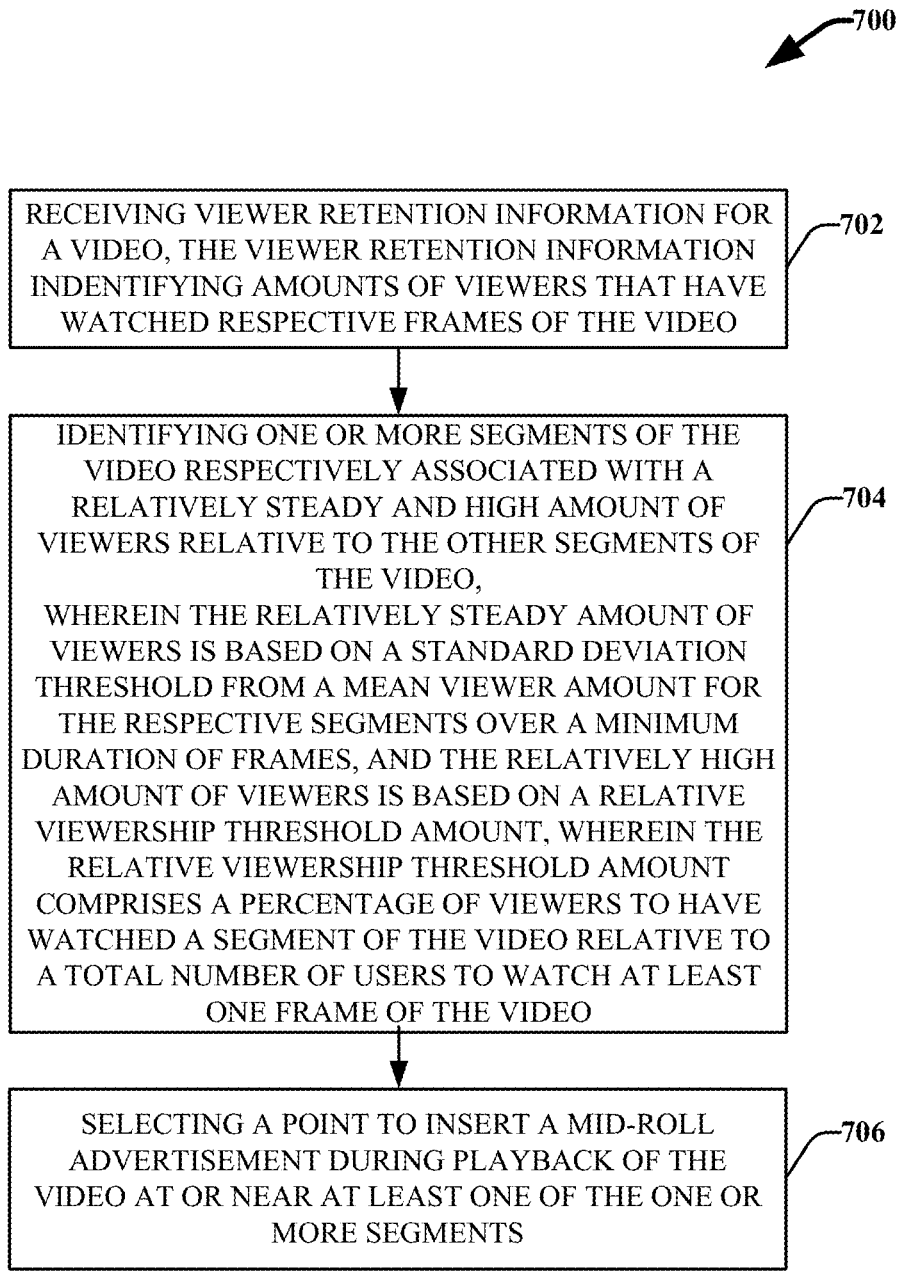
FIG. 7 presents a flow diagram of another example method for optimizing the timing at which a mid-roll video advertisement is played based on viewer retention data in accordance with various aspects and embodiments described herein.
Figure 8:
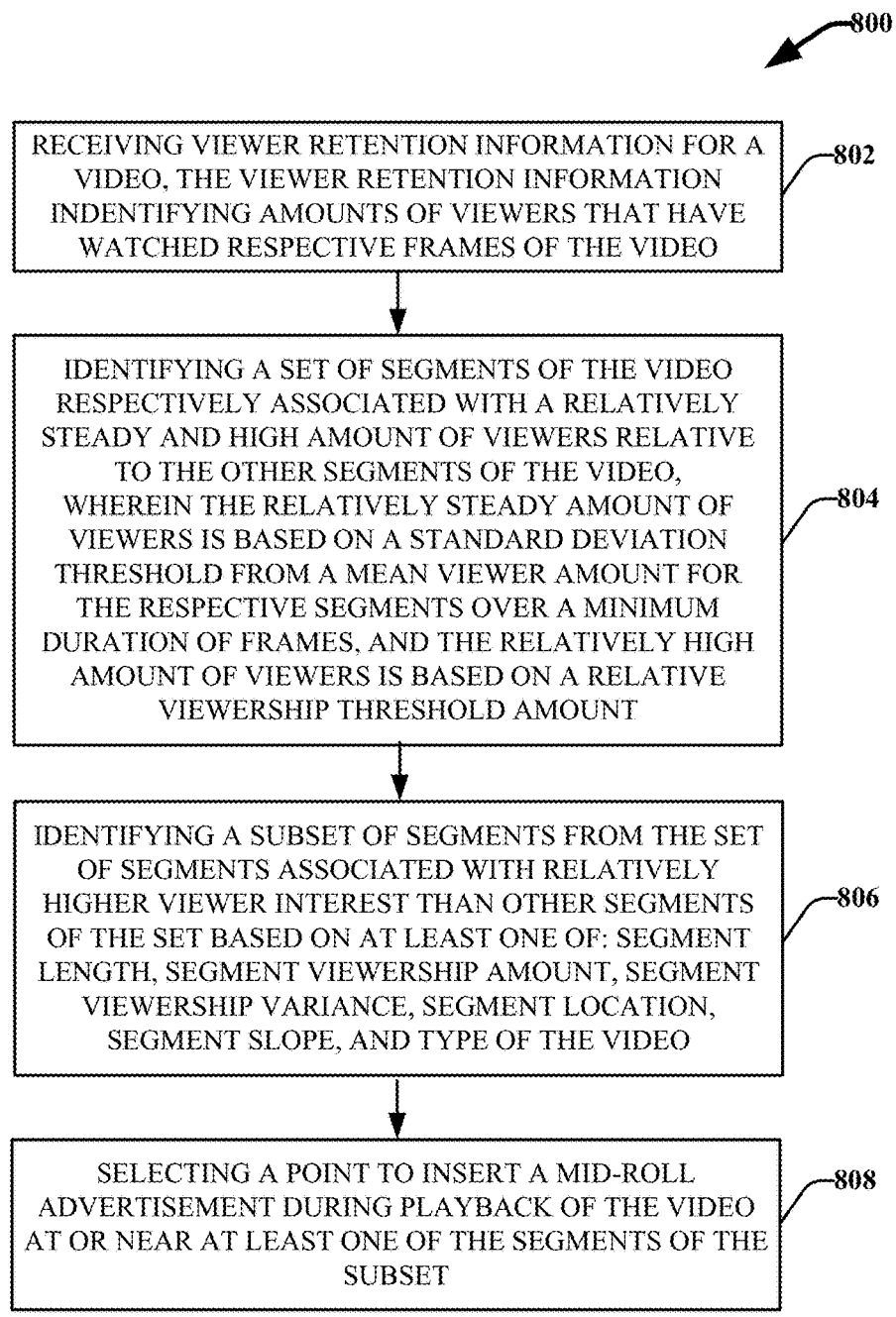
FIG. 8 presents a flow diagram of another example method for optimizing the timing at which a mid-roll video advertisement is played based on viewer retention data in accordance with various aspects and embodiments described herein.

In view of the example systems and/or devices described herein, example methods that can be implemented in accordance with the disclosed subject matter can be further appreciated with reference to flowcharts in FIGS. 6-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 6 illustrates a flow chart of an example method 600 for optimizing the timing at which a mid-roll video advertisement is splayed based on viewer retention data, in accordance with various aspects and embodiments described herein. At 602 viewer retention information for a video is received (e.g., by reception component 106). The viewer retention information indentifies amounts of viewers that have watched respective frames of the video. At 604 high interest segments of the video are identified based on analysis of the viewer retention information (e.g., by identification component 108). Segments identified as high interest segments based on association with relatively higher viewer interest over other segments of the video. At 606, a point to insert a mid-roll advertisement during playback of the video is selected at or near at least one of the high interest segments (e.g., via advertisement component 110). For example, advertisement component 110 can tag a point near the middle of one of the high interest segments with information indicating that it is an optimal place for insertion of a mid-roll advertisement. When the video is later requested for playing, advertisement component 110 can effectuate streaming/playing of a mid-roll advertisement at the tagged point.

FIG. 7 illustrates a flow chart of another example method 700 for optimizing the timing at which a mid-roll video advertisement is played based on viewer retention data, in accordance with various aspects and embodiments described herein. At 702 viewer retention information for a video is received (e.g., by reception component 106). The viewer retention information indentifies amounts of viewers that have watched respective frames of the video. At 704 one or more segments of the video respectively associated with relatively steady and high amounts of viewers relative to the other segments of the video are identified (e.g., by identification component 108). The relatively steady amount of viewers is based on a standard deviation threshold from a mean viewer amount for the respective segments over a minimum duration of frames. The relatively high amount of viewers is based on a relative viewership threshold amount, wherein the relative viewership threshold amount comprises a percentage of viewers to have watched a segment of the video relative to a total number of users to watch at least one frame of the video. At 706, a point to insert a mid-roll advertisement during playback of the video is selected at or near at least one of the one or more segments (e.g., via advertisement component 110).

FIG. 8 illustrates a flow chart of another example method 800 for optimizing the timing at which a mid-roll video advertisement is played based on viewer retention data, in accordance with various aspects and embodiments described herein. At 802 viewer retention information for a video is received (e.g., by reception component 106). The viewer retention information indentifies amounts of viewers that have watched respective frames of the video. At 804, a set of segments of the video respectively associated with relatively steady and high amounts of viewers relative to the other segments of the video are identified (e.g., by identification component 108). The relatively steady amount of viewers is based on a standard deviation threshold from a mean viewer amount for the respective segments over a minimum duration of frames. The relatively high amount of viewers is based on a relative viewership threshold amount, wherein the relative viewership threshold amount comprises a percentage of viewers to have watched a segment of the video relative to a total number of users to watch at least one frame of the video.

At 806, a subset of the set of segments associated with relatively higher viewer interest than other segments of the set are identified based on at least one of segment length, segment viewership amount, segment viewership variance, segment location, segment slope, and type of video (e.g., via filter component 302). For example, depending on a type of the video, an segment included in the set of segments that is associated with a highest viewership amounts, a longer duration, smaller viewership amount variance and a location closest to a midpoint of the video, when compared to other segments of the set, can be selected as an optimal segment for association with a mid-roll video advertisement. At 808, a point to insert a mid-roll advertisement during playback of the video is selected at or near at least one of the segments of the subset (e.g., via advertisement component 110). For example, a point located within the optimal segment can be selected as an ideal mid-roll advertisement insertion point.

Figure 9:
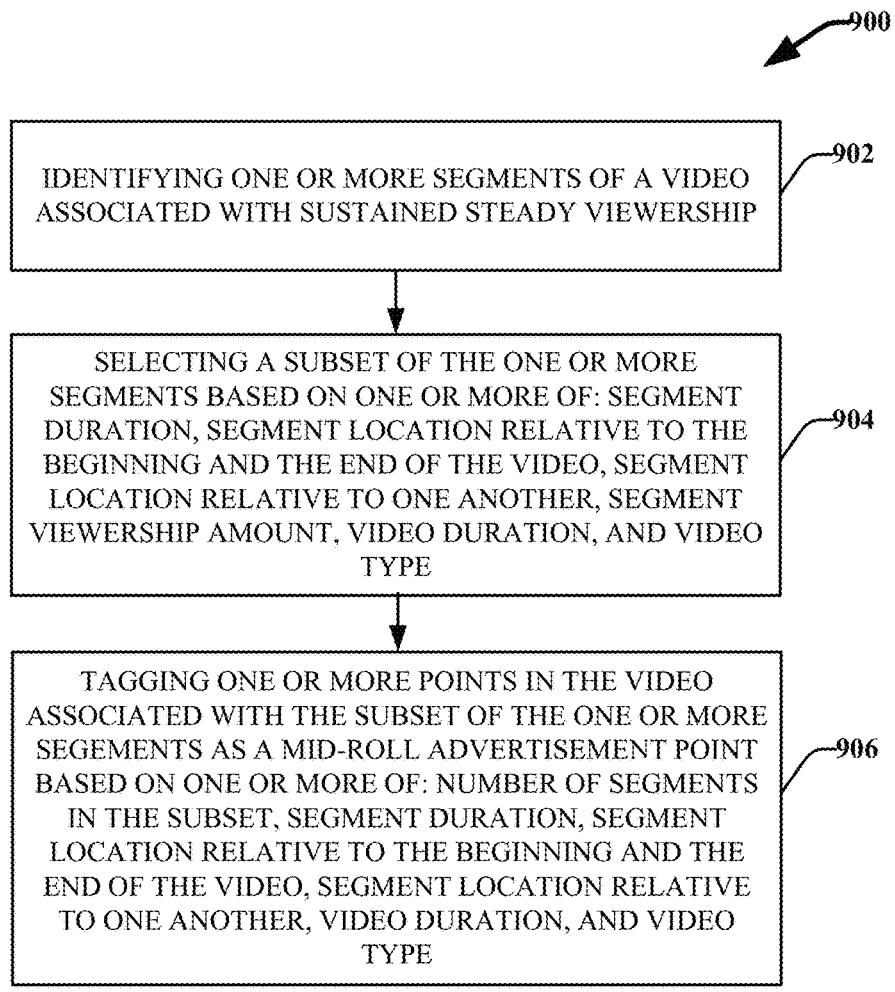
FIG. 9 presents a flow diagram of another example method for optimizing the timing at which a mid-roll video advertisement is played based on viewer retention data in accordance with various aspects and embodiments described herein.

FIG. 9 illustrates a flow chart of another example method 900 for optimizing the timing at which a mid-roll video advertisement is played based on viewer retention data, in accordance with various aspects and embodiments described herein. At 902, one or more segments of a video associated with sustained steady viewership are identified (e.g., via identification component 108). For example, segments of the video associated with sustained and steady viewership are represented on a retention curve as substantially flat (e.g., no sharp incline or decline with minimal peaks and valleys). At 904, a subset of the one or more segments are identified (e.g., via filter component 302) based on one or more of: segment duration, segment location relative to the beginning and the end of the video, segment location relative to one another, segment viewership amount, video duration, and video type. For example, if a video has more than one segment associated with sustained and steady viewership, filter component 302 can identify a subset (e.g., one or more) of these segments that are considered better candidates for association with a mid-roll video advertisement than others based on the factors listed above.

At 906, one or more points in the video associated with the subset of the one or more segments are tagged as mid-roll advertisement points based on one or more of: number of segments in the subset, segment duration, segment location relative to the beginning and the end of the video, segment location relative to one another, video duration, and video type (via advertisement component 110). For example, advertisement component 110 can be configured to tag a point occurring between two high interest segments that are located relatively close to one another and near the middle of the video. In an aspect, advertisement component 110 can select such a point as a good mid-roll advertisement point when the video is a sports related video. In another example, advertisement component can be configured to tag a point in the video occurring within a high interest segment.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
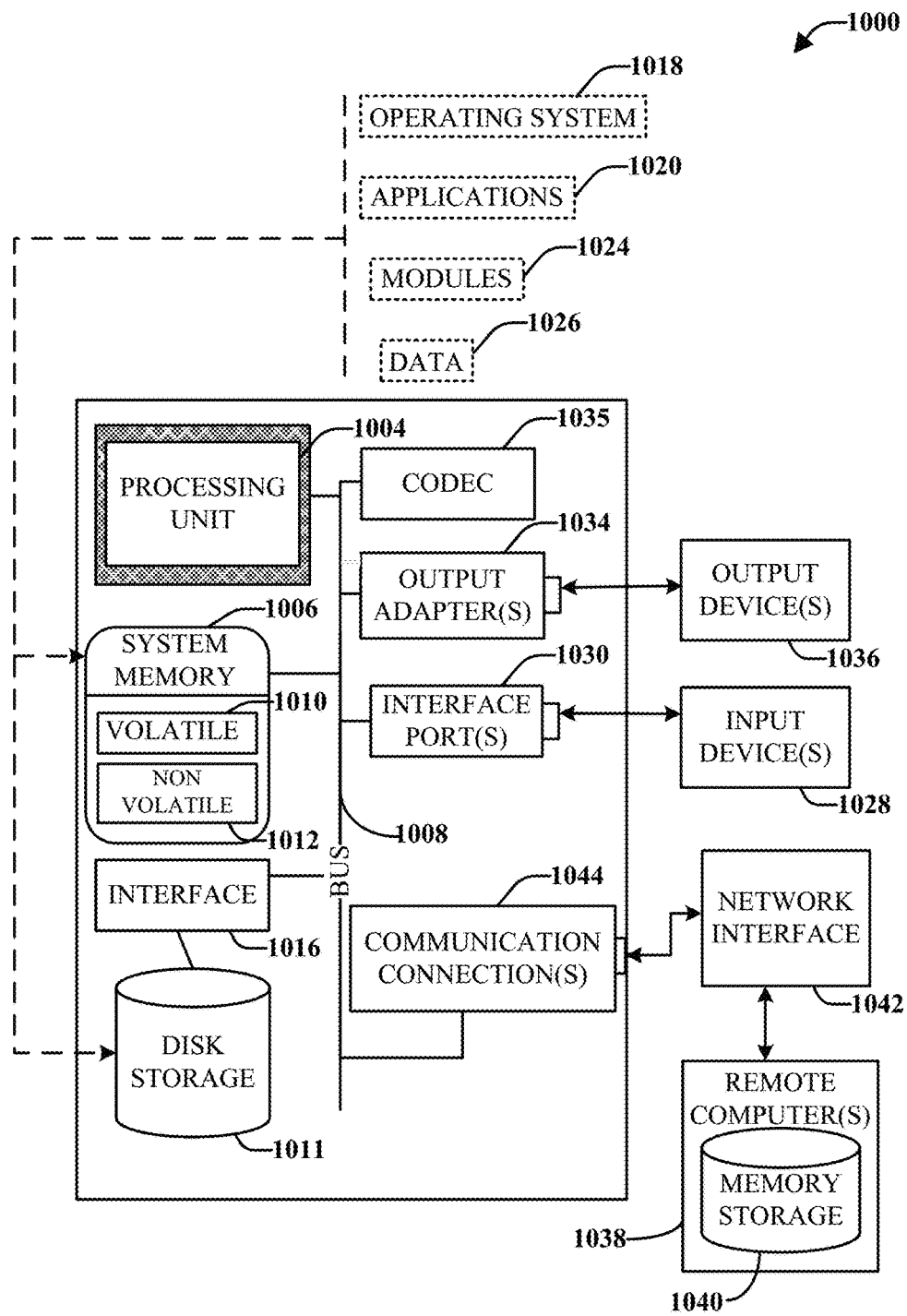
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 104), and Small Computer Systems Interface (SCSI).

The system memory 1006 includes volatile memory 10 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1035 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1011. Disk storage 1011 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1011 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1011 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1011, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1011. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
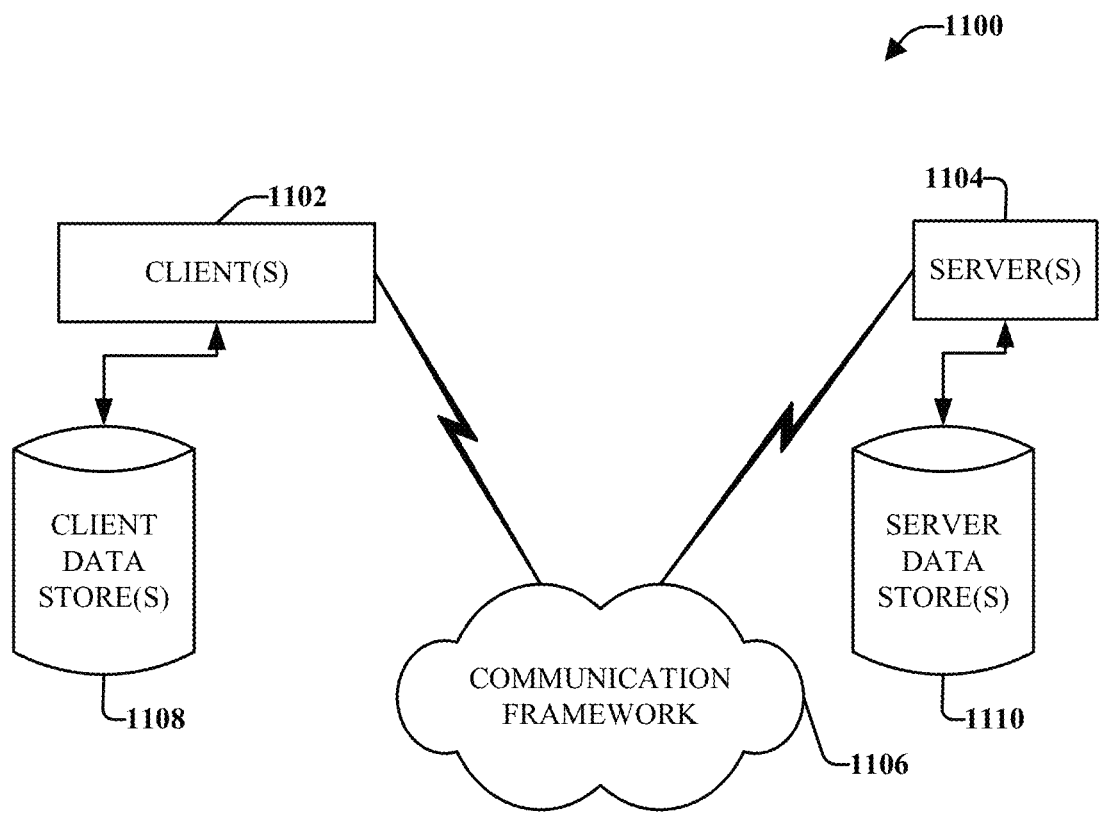
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
a processor;
a memory device having stored thereon computer executable instructions which, when executed by the processor, cause the processor to perform operations including:
receiving, by a reception component, a plurality of viewer retention identifications for a corresponding plurality of frames of a video, each viewer retention identification of the plurality of viewer retention identifications identifying a number of viewers that have watched a corresponding frame of the video;
determining, by an identification component, a characteristic of the video;
calculating, by the identification component, a mean viewer amount for a video segment, wherein the video segment comprises a predetermined number of frames from the video;
calculating, by the identification component, a standard deviation of the number of viewers that have watched each frame of the video segment;
applying, by the identification component, a standard deviation threshold range for the video segment based on the characteristic of the video and the standard deviation of the number of viewers that have watched each frame of the video segment, the standard deviation threshold range based on the standard deviation from the mean viewer amount for the video segment;
comparing, by the identification component, the number of viewers that have watched each frame of the video segment to the standard deviation threshold range;
identifying, by the identification component, the video segment as a high interest segment responsive to a steady viewership identified based on the number of viewers that watched each frame of the video segment being within the standard deviation threshold range for a minimum duration of the video segment; and
selecting, by an advertisement component, at least one optimal point to insert a mid-roll content item during playback of the video at or near the high interest segment identified by the identification component.

2. The system of claim 1, wherein the standard deviation threshold range is further based on a total number of viewers to have watched the video segment.

3. The system of claim 1, wherein the standard deviation threshold range is further based on a ratio of a total number of viewers to have watched any frame of the video segment of the video with respect to a total number of viewers that have watched at least one frame of the video.

4. The system of claim 1, wherein execution of the instructions further cause the processor to perform operations including identifying, by the identification component, the high interest segment of the video responsive to the number of viewers that have watched each frame of the video segment being increased relative to a second number of viewers that have watched each of frame of a preceding segment of the video.

5. The system of claim 1, wherein execution of the instructions further cause the processor to perform operations including identifying, by the advertisement component, a point immediately preceding the high interest segment to insert the mid-roll content item during playback of the video.

6. The system of claim 1, wherein execution of the instructions further cause the processor to perform operations including identifying, by the advertisement component, a midpoint of the high interest segment to insert the mid-roll content item during playback of the video.

7. The system of claim 1, wherein execution of the instructions further cause the processor to perform operations including identifying, by the advertisement component, a point between the high interest segment and a second high interest segment to insert the mid-roll content item during playback of the video.

8. The system of claim 1, wherein selection of the at least one optimal point to insert the mid-roll content item during playback of the video at or near the high interest segment is based in part on a type of the video.

9. The system of claim 1, wherein execution of the instructions further cause the processor to perform operations including identifying, by the identification component, a plurality of high interest segments;
selecting, by a filter component, a subset of the plurality of high interest segments having higher amounts of viewers than other segments of the plurality of high interest segments; and
selecting, by the advertisement component, at least one optimal point to insert a mid-roll content item during playback of the video at or near at least one of the high interest segments of the subset.

10. The system of claim 1, wherein execution of the instructions further cause the processor to perform operations including identifying, by the identification component, a plurality of high interest segments;
selecting, by a filter component, a subset of the plurality of high interest segments based on length of the high interest segments of the subset being longer than other segments of the plurality of high interest segments; and
selecting, by the advertising component, at least one optimal point to insert a mid-roll content item during playback of the video at or near at least one of the high interest segments of the subset.

11. The system of claim 1, wherein execution of the instructions further cause the processor to perform operations including identifying, by the identification component, a plurality of high interest segments;
selecting, by a filter component, a subset of the plurality of high interest segments based on the selected segments having a location closer to a midpoint of the video relative to other segments of the plurality of high interest segments; and
selecting, by the advertising component, at least one optimal point to insert a mid-roll content item during playback of the video at or near at least one of the high interest segments of the subset.

12. The system of claim 1, wherein the predetermined number of frames is set responsive to the characteristic of the video.

13. The system of claim 1, wherein execution of the instructions further cause the processor to perform operations including setting, by the identification component, the standard deviation threshold range and the predetermined number of frames based on a genre of the video.

14. A method comprising:
receiving, by a reception component executed by a processor of a computing device, a plurality of viewer retention identifications for a corresponding plurality of frames of a video, each viewer retention identification of the plurality of viewer retention identifications identifying a number of viewers that have watched a corresponding frame of the video;
determining, by an identification component executed by the processor, a characteristic of the video;
calculating, by the identification component, a mean viewer amount for a video segment, wherein the video segment comprises a predetermined number of frames from the video;
calculating, by the identification component, a standard deviation of the number of viewers that have watched each frame of the video segment;
applying, by the identification component, a standard deviation threshold range for the video segment based on the characteristic of the video and the standard deviation of the number of viewers that have watched each frame of the video segment, the standard deviation threshold range based on the standard deviation from the mean viewer amount for the video segment;
comparing, by the identification component, the number of viewers that have watched each frame of the video segment to the standard deviation threshold range;
identifying, by the identification component, the video segment as a high interest segment response to a steady viewership identified based on the number of viewers that watched each frame of the video segment being within the standard deviation threshold range for a minimum duration of the video segment; and
selecting, by an advertisement component executed by the processor, at least one optimal point to insert a mid-roll content item during playback of the video at or near the high interest segment identified by the identification component.

15. The method of claim 14, further comprising identifying, by the identification component, at least one of: a point immediately preceding the high interest segment to insert the mid-roll content item during playback of the video, a midpoint of the high interest segment to insert the mid-roll content item during playback of the video, or a point between the high interest segment and a second high interest segment to insert the mid-roll content item during playback of the video.

16. The method of claim 14, further comprising:
identifying, by the identification component, a plurality of high interest segments; and
selecting, by the advertisement component, a subset of the plurality of high interest segments having higher amounts of viewers than other segments of the plurality of high interest segments, having longer lengths than other segments of the plurality of high interest segments, or having a location closer to a midpoint of the video relative to other segments of the high interest segments of the subset.

17. The method of claim 16, further comprising identifying, by the identification component, at least one of: a point immediately preceding at least one of the segments of the subset to insert the mid-roll content item during playback of the video, a midpoint of at least one of the high interest segments of the subset to insert the mid-roll content item during playback of the video, or a point between two neighboring segments of the subset to insert the mid-roll content item during playback of the video.

18. The method of claim 14, further comprising setting the predetermined number of frames responsive to the characteristic of the video.

19. The method of claim 14, further comprising setting, by the identification component, the standard deviation threshold range and the predetermined number of frames based on a genre of the video.

20. A non-transitory computer-readable storage device comprising computer-readable instructions that, in response to execution, cause a computing system to perform operations, comprising:

receiving, by a reception component executed by a processor of the computing system, a plurality of viewer retention identifications for a corresponding plurality of frames of a video, each viewer retention identification of the plurality of viewer retention identifications identifying a number of viewers that have watched a corresponding frame of the video;

determining, by an identification component executed by the processor, a characteristic of a video;

calculating, by the identification component, a mean viewer amount for a video segment, wherein the video segment comprises a predetermined number of frames from the video;

calculating, by the identification component, a standard deviation of the number of viewers that have watched each frame of the video segment;

applying, by the identification component, a standard deviation threshold range for the video segment based on the characteristic of the video and the standard deviation of the number of viewers that have watched each frame of the video segment, the standard deviation threshold range based on the standard deviation from the mean viewer amount for the video segment;

comparing, by the identification component, the number of viewers that have watched each of the respective frames of the video segment to the standard deviation threshold range;

identifying, by the identification component, the video segment as a high interest segment response to a steady viewership identified based on the number of viewers that watched each frame of the video segment being within the standard deviation threshold range for a minimum duration of the video segment; and selecting, by an advertisement component executed by the processor, at least one optimal point to insert a mid-roll content item during playback of the video at or near the high interest segment.

* * * * *